United States Patent
Scholze

(10) Patent No.: US 7,577,278 B2
(45) Date of Patent: Aug. 18, 2009

(54) METHOD OF FILTERING AN IMAGE WITH BAR-SHAPED STRUCTURES

(75) Inventor: Steffen Scholze, Hamburg (DE)

(73) Assignee: NXP B.V., Eindhoven (NL)

( * ) Notice: Subject to any disclaimer, the term of this patent is extended or adjusted under 35 U.S.C. 154(b) by 125 days.

(21) Appl. No.: 10/561,309

(22) PCT Filed: Dec. 4, 2003

(86) PCT No.: PCT/IB03/05642

§ 371 (c)(1),
(2), (4) Date: Mar. 13, 2007

(87) PCT Pub. No.: WO2004/055714

PCT Pub. Date: Jul. 1, 2004

(65) Prior Publication Data

US 2008/0031500 A1    Feb. 7, 2008

(30) Foreign Application Priority Data

Dec. 16, 2002    (EP)    ................... 02102763

(51) Int. Cl.
*G06K 9/00*    (2006.01)
(52) U.S. Cl. ..................................... 382/124
(58) Field of Classification Search ............... 382/124
See application file for complete search history.

(56) References Cited

U.S. PATENT DOCUMENTS 5,659,626 A    8/1997    Ort et al.

OTHER PUBLICATIONS

Hong L. et al: "Fingerprint Image Enhancement: Algorithm and Performance Evaluation"; Aug. 1, 1998; IEEE Transactions on Pattern Analysis and Machine Intelligence; IEEE Inc. N.Y.; US vol. 20; NR. 8, pp. 777-789.*

Yang J et al: "A Modified Gabor Filter Design Method for Fingerprint Image Enhancement"; Aug. 2003; Pattern Recognition Letters; North-Holland Publ. Amsterdam, NL; vol. 24; NR. 12; pp. 1805-1817.*

* cited by examiner

*Primary Examiner*—Bhavesh M Mehta
*Assistant Examiner*—Max Shikhman

(57) ABSTRACT

In a method of filtering an image with bar-shaped structures by means of Gabor filters, which are formed in the spatial domain by a two-dimensional Gaussian bell-shaped curve on which a cosine function is superimposed in a main direction, the image is divided into tiles, a predominant direction of the bar-shaped structures is determined for each tile and the filtration is undertaken in such a way that one tile at a time is rotated until the predominant direction lies at right angles to the main direction of the Gabor filter, one filtration takes place in the main direction and another filtration takes place at right angles to this, and the filtered tile is rotated back again.

16 Claims, 2 Drawing Sheets

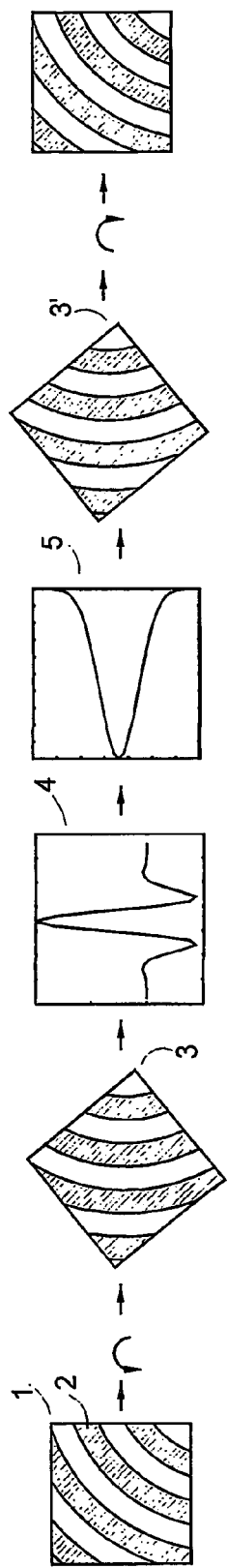
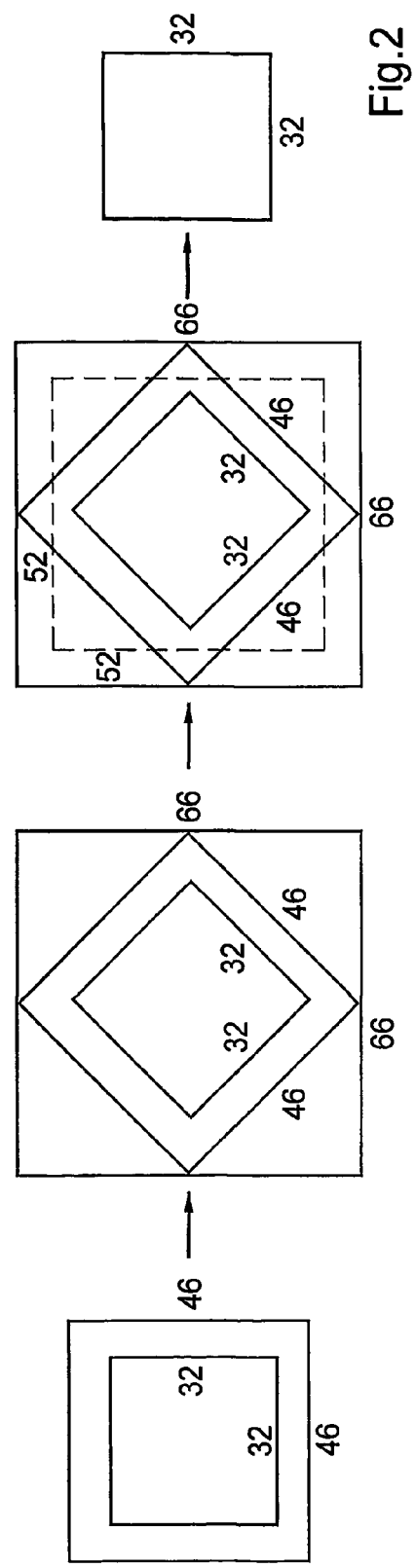
Fig.1
Fig.2

METHOD OF FILTERING AN IMAGE WITH BAR-SHAPED STRUCTURES

The invention relates to a method of filtering an image with bar-shaped structures by means of Gabor filters, which are formed in the spatial domain by a two-dimensional Gaussian bell-shaped curve on which a cosine function is superimposed in a main direction.

An important field of application of the invention relates to the processing of skin-print images, in particular fingerprint images. Starting from a gray-scale image of a fingerprint, as supplied by various commercially available sensors, an intensification of the groove structure contained is to be achieved, together with the repair of any included defects. In a further step, this processed image is binarized and the crucial features are then extracted from the eroded binary image.

Gabor filters have proved their worth in the intensification and repair of (local) groove structures, since their principle is one of direction- and frequency-dependent intensification. Information concerning the main direction and main frequency is required locally as the input values of a local Gabor filtration, together with their local changes. The calculation of these to a sufficient quality is presupposed, and is not a constituent part of the present invention.

The Gabor filtration of an image segment (e.g. a 32×32 tile) is normally undertaken with a diversion via transformation into the frequency domain (FFT=Fast Fourier Transformation), followed by point-by-point multiplication by the Gabor filter mask in tile size, as previously calculated from the local parameters, and then inverse transformation into the time and spatial domain (IFFT=Inverse Fast Fourier Transformation). Owing to artifacts of the transformation that occur (FFT and IFFT), the assembling of the individual result tiles is hereby normally insufficiently precise if this takes place without overlapping of adjacent tiles. Window and overlapping techniques of this kind are part of the prior art.

In known methods, the diversion via the frequency domain is accepted owing to the high degree of complexity of a two-dimensional convolution in the time domain that would otherwise have to be accomplished.

It is an object of the present invention to achieve a Gabor filtration of an image, in particular an image of a skin print, with the least possible complexity as regards program implementations, wherein the filtration is to be largely locally adapted.

This object is achieved in accordance with the invention in that the image is divided into tiles, that a predominant direction of the bar-shaped structures is determined for each tile and the filtration is undertaken in such a way that one tile at a time is rotated until the predominant direction lies at right angles to the main direction of the Gabor filter, that one filtration takes place in the main direction and another filtration takes place at right angles to this, and that the filtered tile is rotated back again.

The present invention enables a local and adaptive Gabor filtration directly in the time domain without a diversion via the frequency domain, without a "true" two-dimensional convolution having to be calculated. This is enabled via the disaggregation of the individual two-dimensional Gabor filters into two one-dimensional filters whose vector product yields the Gabor filter sought, wherein the time sequence can be freely selected. However, the precise disaggregation into two one-dimensional filters is possible only if the wave front of the cosine oscillation and the orthogonal main axes of the superimposed Gaussian bell-shaped curve run in the axial direction, which is accomplished by the filter's fixed alignment in accordance with the invention, with the corresponding rotation of the tile.

In contrast with the realization of the Gabor filtration in the frequency domain, Gabor filtration in the time domain is characterized by the following advantages:

the size of the Gabor filter can be freely selected (it does not have to correspond to the selected tile size),
the structure of the one-dimensional filters is extremely simple to realize with the given parameters,
the tile size is freely selectable without any extra costs arising in terms of time required and program memory (non-quadratic tiles are possible, not just dyadic, as preferably used for FFT/IFFT),
program is simple to realize,
relatively small program memory necessary,
a qualified or required accuracy (both in floating-point and fixed-point arithmetic) can easily be achieved,
no implementation of a two-dimensional FFT/IFFT for target platform is necessary.

An adaptation of the filter to the particular tile is preferably undertaken in that, tile by tile, for one of the filtrations, a cosine oscillation with a frequency equal to the frequency of the structure at right angles to the predominant direction is derived, and that the cosine oscillation is modulated with a Gaussian bell-shaped curve, and, if applicable, tile by tile, for the other of the filtrations, the width of the Gaussian bell-shaped curve depends on the change in direction of the structures on the tile.

A wider Gaussian bell-shaped curve is possible and preferable if the direction of the structures on the tile is subjected to only slight changes. A larger area can then be included in the filtration in the direction of the structures, so that irregularities that do not belong to the structures, e.g. small spots, are suppressed. In the case of contours with pronounced changes on the tile, i.e. strongly curved structures, however, a narrow-band filtration in this direction is necessary. It is further possible to set the width of the Gaussian bell-shaped curve in the direction of the cosine oscillation to depend on the change in frequency on the tile, which, however, is frequently not necessary in the case of fingerprint images if the tile size is matched appropriately.

In order to reduce the implementation and calculation input further, provision may be made in the method in accordance with the invention for selected angles, which are implemented in a particular program, to be defined for the rotation, and then one of the defined angles that most closely accords with the rotation that is necessary per se is used for application of the filtration. Thus, for example, rotations of ±5°, ±10°, ±15°, ..., ±90°, which are minimized as regards their complexity, in particular for specific angles (±45°, ±90°), may be permitted. Against this background it is possible to implement the program optimally in terms of time for each of the selectable angles of rotation.

Since each image element of the particular tile has to be re-calculated during the rotation in any event, the method in accordance with the invention may also be simplified in that, during the rotation, low-pass filtration takes place through interpolation, and/or binarization takes place simultaneously during the back-rotation.

During the rotation in accordance with the invention of the tiles to be filtered, a greater number of image elements is inevitably included in the filtration, so that ultimately a larger tile than the resultant tile is filtered. The size of this tile depends on various influences, e.g. including the size of the filter. In order to filter a tile of defined size that does not overlap with adjacent tiles, one embodiment of the invention that is advantageous in this respect involves the formation of a larger tile that does overlap with the adjacent tiles and is of a size of at least double the root, and, after the rotation, the larger tile is filtered in a square having a side length corresponding to at least double the root of the larger tile.

A further minimization of calculation time can be made in the case of the method in accordance with the invention in that entries (values) lying below a threshold value and located at the edges of the one-dimensional filters are not taken into account during the filtration.

The invention will be further described with reference to examples of embodiments shown in the drawings, to which, however, the invention is not restricted.

FIG. 1 shows, schematically, individual steps of the method in accordance with the invention.

FIG. 2 shows the size of a tile to be filtered at different phases of the method in accordance with the invention.

Figure 3:
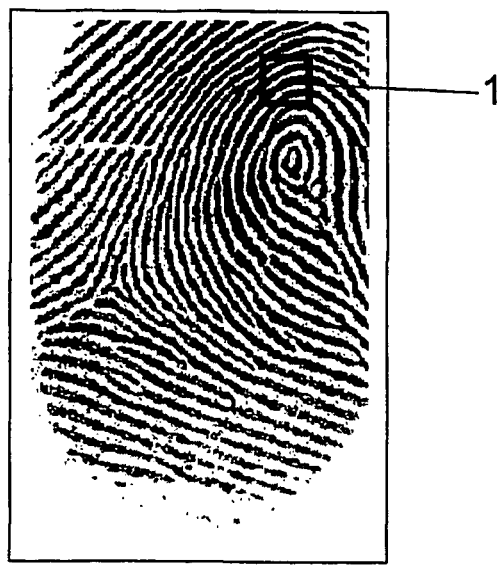
FIG. 3 shows an example of a fingerprint image

FIG. 1 shows the Gabor filtration of a tile 1 of a fingerprint image, wherein, owing to the regulations for patent drawings, the effect of the filtration itself is not shown. Tile 1 is one part of the fingerprint as shown in FIG. 3, and may have, for example, 32×32 image elements. However, other sizes and non-quadratic, square tiles are also possible. With the known Gabor filtration, a two-dimensional filtration, in which the Gabor filter is aligned according to the bars 2 running obliquely and in a curve, would have to take place in the example shown in FIG. 1.

In the method in accordance with the invention, however, the mean direction of the bars is determined with algorithms that are known per se, whereupon tile 1 is rotated in such a way that the mean direction of the bars 2 is located at a right angle. The thus rotated tile 3 is filtered with a filter 4 comprising a cosine function modulated with a Gaussian bell-shaped curve. The frequency of the cosine function is matched, in advance, to the spatial frequency of the bars 2. The width of the Gaussian bell-shaped curve depends on the curvature of the bars and, if applicable, on the change in spatial frequency of the bars.

In a further step, the initially one-dimensionally filtered, rotated tile is filtered at a right angle to the previous filtration with a Gaussian bell-shaped curve 5. The width of this Gaussian bell-shaped curve depends on the mean curvature of the bars 2. Subsequently, the two-dimensionally filtered tile 3' is rotated back to its starting position.

FIG. 2 illustrates that, in order to filter the rotated tiles, larger tiles must initially be derived in order to avoid artifacts at the edges. The starting point hereby is a resultant tile with 32×32 image elements. Owing to the rotation of the tiles, it is necessary to take account of a greater number of image elements. This variable is given by double the root as the diagonal. The filtered tile of a size 32×32 must be derived through back-rotation of a tile having a minimum size to be buffered of 50×50 if a bilinear interpolation is undertaken during the rotation. Artifacts are completely avoided if this buffer is expanded to 52×52 image elements.

In order to obtain a valid area of a size 52×52 for filtration with a filter of 15×15 image elements, a tile to be buffered of a size 66×66 ultimately arises. FIG. 2 shows the individual sizes and rotations in undertaking the method in accordance with the invention, wherein it is assumed that, in order to filter a tile of 32×32 image elements, a tile of 46×46 image elements is taken from the image. A rotation of 45° then yields a tile of 66×66 image elements, of which, however, only an area of 52×52 image elements can be processed with a filter that is 15×15 image elements in size.

The broken line shows this area. From this, however, results of the filtration can be exploited only if all the image elements covered by the particular filter position lie within the rotated 46×46 image-element tile. Following back-rotation, the filtered tile of a size 32×32 emerges, which must not overlap with other result tiles of the image.

FIG. 3 shows a black and white picture of a fingerprint image with a tile 1, as processed in the example shown in FIGS. 1 and 2.

Figure 4:
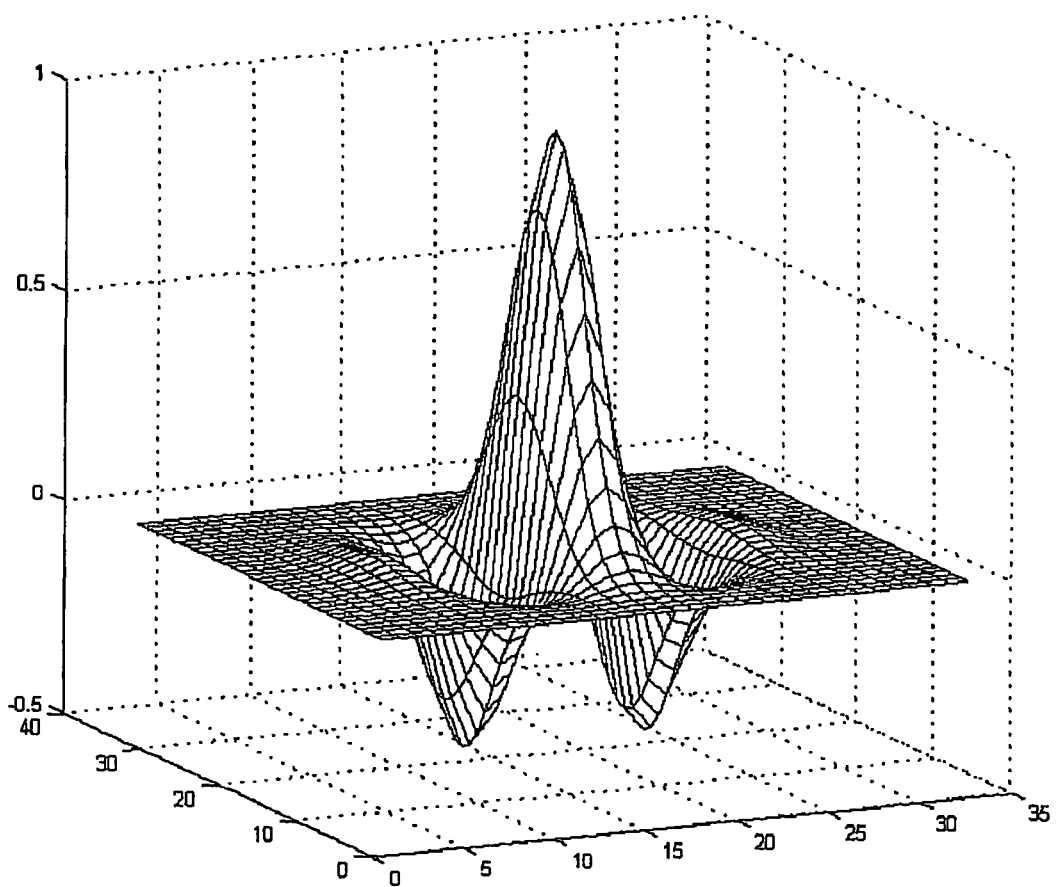
FIG. 4 shows a Gabor filter in perspective view.

FIG. 4 shows a Gabor filter formed in one direction by a Gaussian bell-shaped curve and in the other direction, which is at right angles to it, by a cosine oscillation modulated by a Gaussian bell-shaped curve.

The invention claimed is:

1. A method of filtering an image with bar-shaped structures by means of Gabor filters, which are formed in the spatial domain by a two-dimensional Gaussian bell-shaped curve on which a cosine function is superimposed in a main direction, characterized in that;

an image is captured by a sensor and buffered in a buffer, using a program that is stored in a program memory, the image, which is buffered in the buffer, is divided into a plurality of original, non-overlapping tiles of a known side length, using the program that is stored in the program memory, a predominant direction of the bar-shaped structures is determined for each tile and the filtration is undertaken in such a way that one tile at a time is rotated until the predominant direction lies at right angles to the main direction of the Gabor filter, using the program that is stored in the program memory, one filtration takes place in the main direction and another filtration takes place at right angles to this; wherein in order to filter a tile of said known side length, that does not overlap with adjacent tiles, a larger tile is formed that partially overlaps the adjacent tiles and is of a size having a diagonal of at least double the known side length of the original tile, and after the rotation, a block having a diagonal corresponding to the larger tile is buffered and filtration of the buffered block is performed in a square having a side length corresponding to at least a diagonal of said original tile; and using the program that is stored in the program memory, the filtered tile is rotated back again to obtain a filtered tile of said known side length.

2. A method as claimed in claim 1, characterized in that, tile by tile, for one of the filtrations, a cosine oscillation with a frequency equal to the frequency of the structure at right angles to the predominant direction is derived, and in that the cosine oscillation is modulated with a Gaussian bell-shaped curve.

3. A method as claimed in claim 1, characterized in that, tile by tile, for the other of the filtrations, the width of the Gaussian bell-shaped curve depends on the change in direction of the structures on the tile.

4. A method as claimed in claim 2 characterized in that the width of the Gaussian bell-shaped curve in the direction of the cosine oscillation is set to depend on the change in frequency on the tile.

5. A method as claimed in claim 1 characterized in that selected angles, which are implemented in a particular program, are defined for the rotation, and then one of the defined angles that most closely accords with the rotation that is necessary per se is used for application of the filtration.

6. A method as claimed in claim 1 characterized in that during the rotation, low-pass filtration takes place through interpolation.

7. A method as claimed in claim 1, characterized in that binarization takes place simultaneously during the back-rotation.

8. A method as claimed in claim 1, characterized in that entries (values) lying below a threshold value and located at the edges of the one-dimensional filters are not taken into account during the filtration.

9. A program memory storing a program that implements a method of filtering an image with bar-shaped structures by means of Gabor filters, wherein the Gabor filters are formed in the spatial domain by a two-dimensional Gaussian bell-shaped curve on which a cosine function is superimposed in a main direction, characterized in that;

the image is divided into a plurality of original, non-overlapping tiles of a known side length, a predominant direction of the bar-shaped structures is determined for each tile and the filtration is undertaken in such a way that one tile at a time is rotated until the predominant direction lies at right angles to the main direction of the Gabor filter, one filtration takes place in the main direction and another filtration takes place at right angles to this; wherein in order to filter a tile of said known side length, that does not overlap with adjacent tiles, a larger tile is formed that partially overlaps the adjacent tiles and is of a size having a diagonal of at least double the known side length of the original tile, and after the rotation, a block having a diagonal corresponding to the larger tile is buffered and filtration of the buffered block is performed in a square having a side length corresponding to at least a diagonal of said original tile; and the filtered tile is rotated back again to obtain a filtered tile of said known side length.

10. The program memory as claimed in claim 9, characterized in that, tile by tile, for one of the filtrations, a cosine oscillation with a frequency equal to the frequency of the structure at right angles to the predominant direction is derived, and in that the cosine oscillation is modulated with a Gaussian bell-shaped curve.

11. The program memory as claimed in claim 9, characterized in that, tile by tile, for the other of the filtrations, the width of the Gaussian bell-shaped curve depends on the change in direction of the structures on the tile.

12. The program memory as claimed in claim 10 characterized in that the width of the Gaussian bell-shaped curve in the direction of the cosine oscillation is set to depend on the change in frequency on the tile.

13. The program memory as claimed in claim 9 characterized in that selected angles, which are implemented in a particular program, are defined for the rotation, and then one of the defined angles that most closely accords with the rotation that is necessary per se is used for application of the filtration.

14. The program memory as claimed in claim 9 characterized in that during the rotation, low-pass filtration takes place through interpolation.

15. The program memory as claimed in claim 9, characterized in that binarization takes place simultaneously during the back-rotation.

16. The program memory as claimed in claim 9, characterized in that entries (values) lying below a threshold value and located at the edges of the one-dimensional filters are not taken into account during the filtration.

* * * * *